Figure 1:
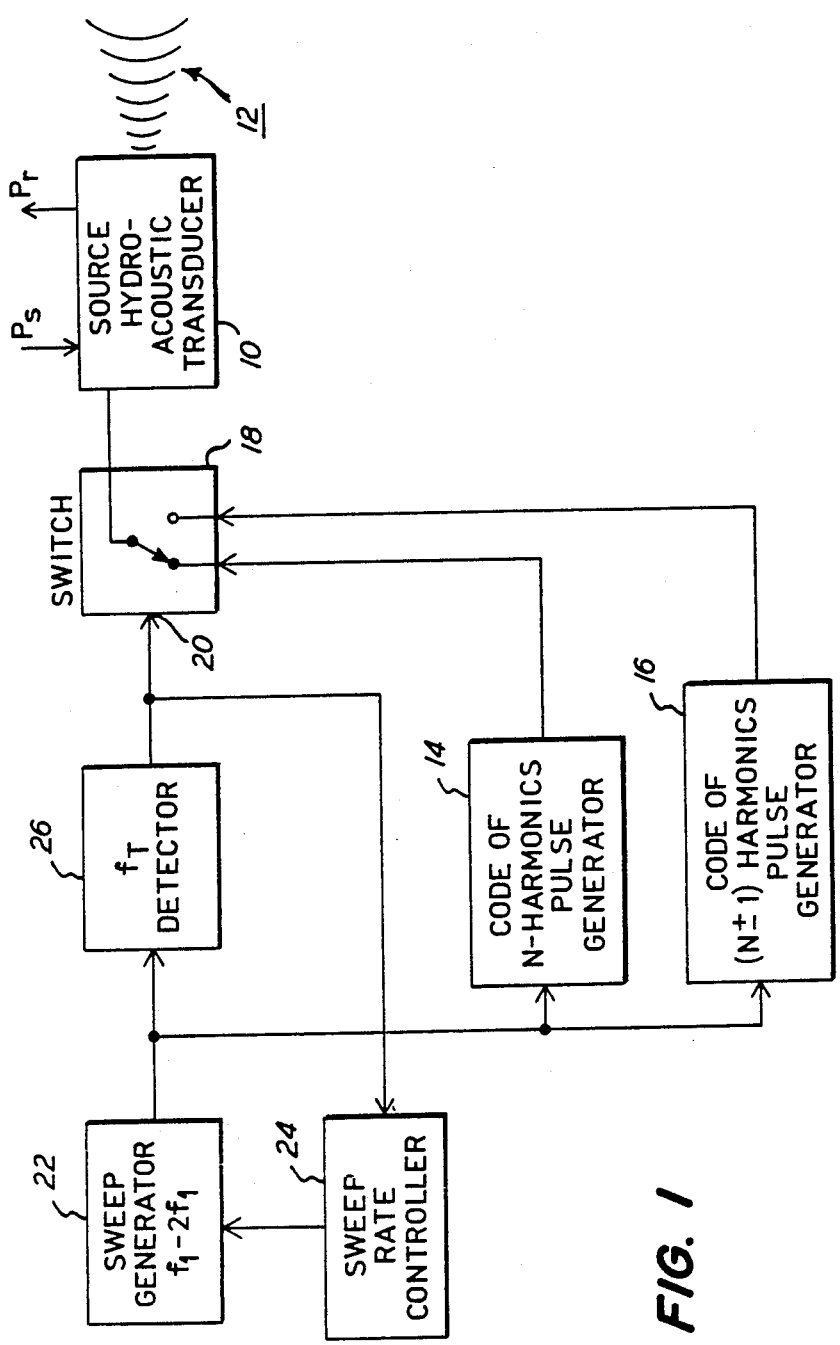

United States Patent [19]

Nelson

[11] Patent Number: 4,758,997
[45] Date of Patent: Jul. 19, 1988

[54] METHOD AND APPARATUS FOR THE GENERATION AND TRANSMISSION OF SIGNALS FOR ECHO LOCATION AND OTHER SIGNALING PURPOSES, PARTICULARLY IN GEOPHYSICAL EXPLORATION

[75] Inventor: David E. Nelson, Rochester, N.Y.

[73] Assignee: Hydroacoustics Inc., Rochester, N.Y.

[21] Appl. No.: 899,693

[22] Filed: Aug. 25, 1986

[51] Int. Cl.$^4$ .......................... G01V 1/22; G01V 1/14
[52] U.S. Cl. ........................................ 367/49; 367/23; 181/120
[58] Field of Search ........................ 367/14, 23, 39, 41, 367/42, 49; 181/114, 119, 120; 375/23; 364/421

[56] References Cited

U.S. PATENT DOCUMENTS

| | | | |
|---|---|---|---|
| 3,375,896 | 4/1968 | Bedelo | 367/189 |
| 4,037,190 | 7/1977 | Martin | 367/49 |
| 4,147,228 | 4/1979 | Bouyoucos | 118/119 |
| 4,188,610 | 2/1980 | Nelson | 367/23 |
| 4,204,278 | 5/1980 | Nelson | 367/39 |
| 4,207,962 | 6/1980 | Bouyoucos | 367/41 |
| 4,295,213 | 10/1981 | Mifsud | 367/41 |
| 4,321,427 | 3/1982 | Singh | 73/585 |
| 4,680,741 | 7/1987 | Wales | 367/189 |
| 4,712,198 | 12/1987 | Fail | 367/23 |

OTHER PUBLICATIONS

Cunningham, A. B.; "Some Alternate Vibrator Signals", 11/1/1978, Geophysics, vol. 44, #12, pp. 1901-1914.

Hardie, H. C.; "The Resonant Acoustic Pulser ... Source", 8/83, Geophysics, vol. 48, #8, pp. 1082-1089; abst. only.

Primary Examiner—Nelson Moskowitz
Attorney, Agent, or Firm—Martin LuKacher

[57] ABSTRACT

A transmission from a hydroacoustic source, especially for underwater geophysical exploration, is generated in accordance with two binary codes (provided by two pulse trains or sequences having two levels and which provide a spectrum of harmonically related components). One of these codes has one more or one less harmonic component than the other. The transmission is provided with a frequency spectrum which extends between an upper and lower frequency limit by sweeping the pulse trains over an octave (2:1) frequency range, far shorter than the range of the spectrum, and utilizing one of the codes and then the other of the codes during the sweep. The spectrum of the transmission extends between two arbitrary frequencies which need not be harmonically related, notwithstanding that the sweep is limited to an octave in frequency range. By adjusting the rate at which the pulse train which defines the first code sweeps with respect to the rate at which the pulse train which defines the second code sweeps, the energy of the spectrum will be smooth and continuous, thereby avoiding introducing undesirable undulations in the autocorrelation function of the transmission.

18 Claims, 2 Drawing Sheets

METHOD AND APPARATUS FOR THE GENERATION AND TRANSMISSION OF SIGNALS FOR ECHO LOCATION AND OTHER SIGNALING PURPOSES, PARTICULARLY IN GEOPHYSICAL EXPLORATION

DESCRIPTION

The present invention relates to methods and apparatus for generating and transmitting signals in accordance with a predetermined format or code so as to provide a transmission having a defined energy (power) spectrum extending over a non-octave frequency range which is useful for echo location and other signaling purposes.

The invention is especially adapted for use in the generation of seismic signals for use in geophysical exploration and enables such signals to be transmitted at high energy levels in the form of pulses over the non-octave frequency range of interest, either in marine environments or on land.

The present invention is an improvement in the Multipulse® method and apparatus of seismic signaling which is described in U.S. patent application Ser. No. 685,816, filed Dec. 24, 1984 in the name of David E. Nelson, et al, now U.S. Pat. No. 4,729,066. Reference may be had to the appendix hereto which contains the drawings and detailed description of the Nelson, et al. application and which is unpublished but part of the patented file, for further information respecting the method and apparatus described therein. The Multipulse® method and apparatus of seismic signaling is also described in the following U.S. Pat. Nos.: 4,147,228 issued Apr. 3, 1979 to J. V. Bouyoucos; 4,188,610 issued Feb. 12, 1980 to David E. Nelson; 4,204,278 issued May 20, 1980 to David E. Nelson; and 4,207,962 issued June 17, 1980 to J. V. Bouyoucos. In the Nelson, et al. application and in the Nelson U.S. Pat. Nos. 4,188,610 and 4,204,278, it is shown that a transmission of pulse signals which sweeps over a fundamental frequency range of an octave (2:1) is provided with harmonically related components exhibited by harmonic lines (lines at frequencies related by $2^N$, where N is an integer) having relative amplitudes of the square root of 2 times that of its preceding octave harmonic component. A sweep of such pulse signals over the octave frequency range produces a harmonic power spectrum which extends over a broader frequency range than the fundamental sweep by virtue of the harmonics present. These pulse trains are also referred to as codes. When a seismic transducer is driven in accordance with the codes, it produces acoustic signals (either in marine environments or on land) especially suitable for use in geophysical exploration in which seismograms are constructed by cross-correlation of the transmitted signals when they are received from the geological reflection surfaces. The pulses may be transmitted by different seismic sources, or as is preferable and in accordance with the Nelson, et al., application, by a single seismic source having a switched fluid amplifier such as described in Bouyoucos U.S. Pat. No. 4,207,962.

The codes which were provided heretofore were operative to create a spectrum having N octaves, where N is an integer. It is desirable that the spectrum extend over an arbitrary, non-octave frequency range, when such a frequency range is of interest; for example, a frequency range from 8 Hz to 100 Hz which is 3.644 octaves. In order to cover such a frequency range in accordance with the Nelson et al. application or the Nelson Patents, the frequency range required to be swept was from 8 to 128 Hz (a 16:1) ratio. In sweeping this broader frequency range, energy was generated outside of the range of interest. The acoustic power spectrum level was also unavoidably reduced because of the increased sweep rate necessary to cover the increased frequency range over a specified transmission interval. The faster pulses utilized in sweeping the broader frequency range also demanded faster flow and stroke (piston movement) from the Hydroacoustic source which made it difficult to operate without distortion of the source response.

Accordingly, it is the principal object of the present invention to provide a method of and apparatus for generation of transmissions of signals having a spectrum which cover any frequency range of interest, including ranges the beginning and ending frequency of which are not harmonically related, using codes provided by trains of pulses which sweep in frequency over only one octave.

It is a further object of the invention to provide improved methods of an apparatus for generating transmissions of acoustic signals having autocorrelation functions suitable for geophysical exploration which are not restricted to an integral number of octaves when generated.

It is a still further object of the invention to provide improved methods and apparatus for generating Multipulse® signal codes which sweep over a 2:1 frequency range and which provide spectra over a non-octave frequency range.

It is a still further object of the present invention to provide an improved method of and apparatus for generating transmissions of signals at high acoustic energy spectrum levels over an entire non-octave range in accordance with codes which can be swept in frequency over an octave range.

Briefly described, the invention utilizes two codes, one of which has one more or one less harmonically related component than the other. Both codes are provided by pulse signals which sweep over an octave frequency range which is the same frequency range for both codes. At a frequency which is octave harmonically related to a frequency at the upper end of the frequency range, the control of the generation of the transmission is switched from one of the codes to the other. In the case of a sweep from a lower-most frequency in the range, the sweep begins with the fundamental frequency component at the lower-most frequency to be transmitted, and a code (sequence of pulses at the fundamental frequency) whose harmonically related components cover the range (are valid) to within one octave of the upper-most frequency to be transmitted is used. The sweep is continued until the upper harmonic component reaches the upper-most frequency to be transmitted. At this frequency in the sweep over the fundamental period, the code is changed to a second code having one less harmonically related component. The sweep is then resumed with the new code at the transition frequency and continues until the fundamental frequency has doubled (one octave), then the second code covers the entire non-octave range of interest. First one code and then the other is applied to the seismic source. The exact sequence of sweeping the 2:1 frequency range is unimportant and subdivisions thereof can be interchanged, so long as each frequency therein is swept through once and only once per transmission.

No energy is generated outside of the prescribed non-octave frequency band, which otherwise would be wasted if the code were not changed at the transition frequency. Substantial power savings and efficiency results. The sweep rate (rate of change of frequency) can be different and either linear or non-linear during the sweep of each of the codes so as to tailor the shape of the power spectrum of the transmission, and equalize the spectral energy on either side of a spectral joint between the two codes.

Figure 2:
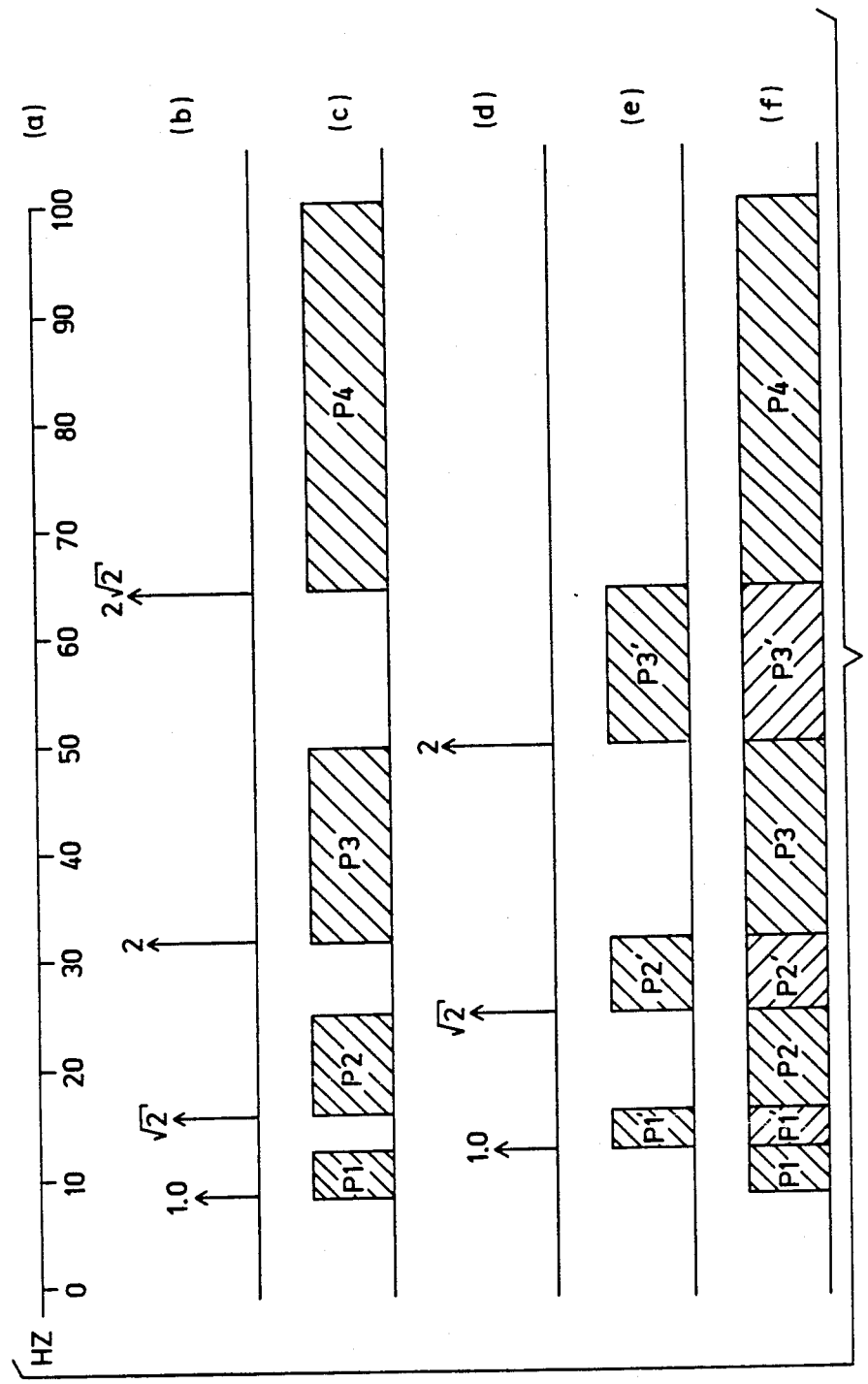

The foregoing and other objects, features and advantages of the invention as well as a presently preferred embodiment thereof and the best mode now known for practicing the invention, will become more apparent from the reading of the following description in connection with the accompanying drawings in which:

FIG. 1 is a block diagram schematically showing a Multipulse® transmission system embodying the invention; and FIG. 2 are several diagrams illustrating the spectrum of the pulse trains or sequences of pulses which provide the different codes.

Referring to the drawings, there is shown in FIG. 1 a source 10 of acoustic energy which is preferably a Hydroacoustic ™ seismic transducer of the design described in the above-referenced Bouyoucos U.S. Pat. No. 4,207,960. This source converts the flow of pressurized hydraulic liquid from a pump, the output of which is indicated at $P_s$ which goes to a return indicated as at $P_r$, into acoustic energy which is diagrammatically represented by the wave fronts 12. This source may be located on land or under water.

The signals for controlling the source 10 are selected from two pulse generators which generate two codes. The first of these pulse generators 14 generates codes (a pulse sequence or train) having N harmonically related components (harmonics), where N is an integer. The other generator 16 generates a code of $N\pm1$ harmonics. The code from the second generator 16 has one less harmonic than the code from the first generator 14 when the harmonic spectrum is generated during an upsweep from a lower-most frequency to an upper-most frequency. When the code is generated in the reverse direction with a sweep from an upper-most frequency to a lower-most frequency, the generator 16 provides one more harmonic than the first generator 14.

These codes are selected by a switch 18, which may be an electronic switch, having a control port 20. The control signals to this port are derived from a sweep generator 22 which sweeps over a fundamental time interval from $f_1$ to $2f_1$ or vice versa. The rate at which the generator sweeps is controlled by a sweep rate controller 24. The sweep generator may be an oscillator which receives a control voltage for changing its frequency which is modified by the sweep rate controller 24. The sweep generator sweeps the pulse sequences over the fundamental time interval as these sequences are generated by the pulse generators 14 and 16. The sweep generator 22 and the pulse generators 14 and 16 are designed in accordance with the Nelson, et al. application referenced above (which is included insofar as its detailed description and drawings are concerned in the appendix). Alternatively, several pulse sequences may be generated one for each of a separate seismic transducer when the techniques of code generation described in the Nelson Patents are used.

A frequency detector 26 detects a transition frequency, $f_T$ and provides the control signal to the switch 18 for switching the pulse generators 14 and 16 to the hydroacoustic seismic source 10. The control signal also may provide an input to the sweep rate controller 24 which changes the sweep rate which is operative to generate the codes in the different code pulse generators 14 and 16.

Although the pulse trains or sequences produced by the generators 14 and 16 sweep over one octave (the fundamental period), the spectrum so generated over the sweep occupies a frequency range which is much wider because of the harmonic components of the pulse sequences. The fundamental component of these harmonic components is the lowest frequency of the fundamental sweep. The other harmonic components are octave harmonics of this fundamental frequency. The above-identified Nelson Patents and Nelson, et al. application explain how these harmonic components arise by the selection of pulses having different phase relationships in the case of the Nelson Patents or different pulse position or pulse duration modulation in the case of the Nelson, et al. application.

FIG. 2 (a) shows the frequency scale for an exemplary case where the spectrum is flat over a frequency range from 8 to 100 Hz. In the example, an upsweep is used with the sweep range, $f_1$ to $2f_1$ being from 8 to 16 Hz. The code generator 14 provides a four octave code with the fundamental at 8 Hz and harmonics at 16, 32 and 64 Hz. These harmonics are related by N times the square root of 2 in relative amplitude for a flat spectrum. Thus the fundamental has a relative amplitude of 1, the 16 Hz harmonic component has a relative amplitude of the square root of 2, the 32 Hz component has an amplitude of 2 and the 64 Hz component has an amplitude of 2 times the square root of 2, all as shown in the diagram indicated at (b).

This code is swept in frequency upwardly until the upper-most harmonic (the fourth which started at 64 Hz) reaches the upper-most frequency of the desired frequency range (100 Hz). The portions of the spectral range which are covered by each of the harmonic components is shown in part (c) of the diagram as spectrum panels—P1, P2, P3 and P4. When the fourth harmonic component is at 100 Hz, the fundamental component is at 12.5 Hz. 12.5 Hz is harmonically related to the upper-most frequency in the range of interest, 100 Hz. The transition frequency $f_T$ is 12.5 Hz. This is the frequency where the second code starts.

The second code has its lower-most fundamental frequency equal to 12.5 Hz. This frequency is octave harmonically related to the upper-most frequency of the frequency range of interest. The second code from the generator 16 has only 3 harmonic components at 12.5 Hz, 25 Hz and 50 Hz. The relative amplitudes of these components are related by the square root of 2 as was the case for the first code. Each of these harmonic components sweeps a frequency range which stops where the fundamental reaches the upper limit of the code or 16 Hz. The portions of the frequency range swept by the second code are shown in diagram (e) of FIG. 2 as the panels P1', P2' and P3'. It will be noted that when the panels P1, P1', P2, P2', P3, P3' and P4 are combined as shown in diagram (f) the spectrum contains energy which is smooth and continuous from 8 to 100 Hz.

In order to avoid "spectral joints" where one panel ends and another begins, thereby avoiding introduction of undesirable undulations in the autocorrelation function of the transmission, the heights of the individual harmonics may be adjusted. However, it is more desirable to change the sweep rate, i.e., the rate at which each code is swept. This is accomplished by detecting the transition frequency $f_T$ and operating the sweep rate generator 24 at a different, higher sweep rate during the second code from the second generator 16; higher sweep rates producing less energy over time.

While the example shown in FIG. 2 illustrates a code which starts the sweep at the lower-most frequency, a code may be generated by sweeping downwardly from the upper most frequency of the lower octave until the lower-most frequency of the lower octave is met. In such event the second pulse generator 16 is provided with one more harmonic than the first code generator. In the illustrated case for a sweep from 100 Hz to 8 Hz, the first code generator 14 would provide 3 harmonic components and the second pulse generator 16 would provide 4 harmonic components.

Expressed mathematically and given that the lower and upper frequency limits for the desired sweep are L and U, respectively, so that the spectrum extends from L to U, the sweep range is $$2^{(N.x)} = U/L$$

This is referred to an N.x octave sweep or a non-octave harmonic range. The code from the first generator 14 has N+1 harmonics and its fundamental frequency sweep range is from L to $U/2^N$. The code from the second generator 16 has N harmonics and sweeps from $U/2^N$ to 2xL. In the illustrated case x is 0.644. The frequency spectrum covers 3.644 octaves.

While a continuous sweep of one code and then the other is preferred, it is equivalent to sweep the 2:1 frequency range in other orders and subdivisions. As noted above, the results are the same so long as each frequency in the range is swept through once and only once per transmission.

From the foregoing description it will be apparent that there has been provided an improved method and apparatus for generating transmissions of signals having an energy spectrum over a frequency range of interest, which has frequencies which are non-harmonically related at the upper and lower ends thereof. The invention has been described in connection with the generation of a Multipulse ® transmission. Variations and modifications as well as other applications for the herein described codes, will undoubtedly suggest themselves to those skilled in the art. Accordingly the foregoing description should be taken as illustrative and not in a limiting sense.

I claim:

1. The method of transmitting a sequence of signals having a spectrum which extends over a frequency range which comprises the steps of generating first plurality of pulse signals second plurality of pulse signal one of which pluralities of pulse signals has N spectral components which are integer wise harmonically related to each other and the other of which pluralities of pulse signals has a plurality of spectral components also integer wise harmonically related to each other and differing by one only component from said N spectral components, sweeping by a factor of 2:1 the repetition rates of said first and second pluralities of pulse signals, providing a continuous output signal consisting of said first pulse signal followed by said second pulse signal during the sweeping step, thereby providing a continuous transmission which extends over said frequency range the frequencies at the ends of which frequency range need not be harmonically related.

2. The method according to claim 1 wherein said output signal providing step is carried out by selecting said first pulse signal and then said second pulse signal before and after said repetition rate reaches a certain rate during said sweeping step.

3. The method according to claim 1 including the step of driving an acoustic transducer with said output.

4. The method according to claim 1 including the step of driving a seismic switched amplifier transducer with said output.

5. The method according to claim 1 including the step of driving a plurality of seismic transducers, each with a different pulse of said signals.

6. The method according to claim 1 wherein said pulse signals each provide a spectrum of harmonic components which have amplitudes which are related by products of the square root of 2.

7. The method according to claim 6 wherein the frequency range of said spectrum is expressed as $$2^{(N.x)} = U/L$$

where U and L are the upper and lower ends of said frequency range, and said sweeping step is carried out so that said first signal is swept over a range from L to $U/2^N$ and said second signal is swept over a range from $U/2^N$ to 2xL, and x is a decimal number less than unity.

8. The method according to claim 7 wherein said sweeping step is carried out by sweeping said first and second signals at different rates.

9. Apparatus for transmitting a sequence of signals having a spectrum which extends over a frequency range which comprises means for generating first plurality of pulse signals second plurality of pulse signals which provide codes having N spectral components which are integer wise harmonically related to each other and N plus or minus one spectral components which are integer wise harmonically related to each other, respectively, means for sweeping by a factor of 2:1 the repetition rates of said first and second pluralities of pulse signals, means for providing an output signal consisting of said first pulse signals and then second pulse signal, with said first pulse signal being provided on one side of the certain rate and said second pulse signal on the opposite side of said certain rate during the sweep, thereby providing a continuous transmission extending over said frequency range, the upper-most and lower-most frequencies of which need not be harmonically related.

10. The apparatus according to claim 9 wherein said sweeping means has means operative to provide said transmission with said first pulse signal and then with said second pulse signal before and after said repetition rate reaches said certain rate.

11. The apparatus according to claim 9 further comprising an acoustic transducer, and means for driving said acoustic transducer with said output 12. The apparatus according to claim 9 further comprising a hydroacoustic switched amplifier transducer, and means for driving said transducer with said output.

13. The apparatus according to claim 9 further comprising a plurality of acoustic transducers and means for driving each of said transducers separately with a different pulse of said signals.

14. The apparatus according to claim 9 wherein said code generating means includes means for providing said harmonic components which are related by products of the square root of 2.

15. The apparatus according to claim 14 wherein said frequency range of said spectrum is expressed as $$2^{(N-x)} = U/L$$

where U and L are the upper and lower ends of said frequency range, and said sweeping step is carried out so that said first signal is swept over a range from L to $U/2^N$ and said second signal is swept over a range from $U/2^N$ to 2xL, and x is a decimal number less than unity.

16. The apparatus according to claim 15 wherein said sweeping means comprises means for sweeping said first and second signals at different rates.

17. The method of transmitting a sequence of signals over a seismic frequency range exceeding one octave in width which comprises the steps of generating first and second pluralities of pulse repetition signals each having harmonic components of its fundamental repetition rate at octave intervals, the first having N harmonic components and the second having N±1 harmonic components, sweeping the fundamental repetition rate of each said pulse signals by a factor of 2:1, providing an output signal consisting of the first of said pluralities of pulse signals during a first portion of the sweep and the second of said pluralities of pulse signals during a second portion of the sweep, the first and second portions comprising the total frequency range of said sweep, thereby providing a transmission which extends over said seismic frequency range, the frequencies at the lowermost and uppermost limits of which do not need to be harmonically related.

18. Apparatus for transmitting a sequence of signals over a seismic frequency range exceeding one octave in width which comprises means for generating first and second pluralities of pulse repetition signals each having harmonic components of its fundamental repetition rate at octave interals, the first having N harmonic components and the second having N±1 harmonic components, means for sweeping the fundamental repetition rate of each said pulse signals by a factor of 2:1 over a sweep having first and second portions, means for providing an output signal consisting of the first of said pluralities of pulse signals during the first portion of said sweep and the second of said pluralities of pulse signals during the second portion of said sweep, the first and second portions comprising the total range of said sweep, thereby providing a transmission which extends over said seismic frequency range, the frequencies at the lowermost and uppermost limits of which do not need to be harmonically related.

* * * * *